(12) United States Patent
Park et al.

(10) Patent No.: US 6,999,152 B2
(45) Date of Patent: Feb. 14, 2006

(54) METHOD OF FABRICATING LIQUID CRYSTAL DISPLAY

(75) Inventors: Dug jin Park, Daegu-shi (KR); Hai Sung Park, Kumi-shi (KR); Byung Chul Ahn, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/788,587

(22) Filed: Feb. 21, 2001

(65) Prior Publication Data

US 2001/0015789 A1     Aug. 23, 2001

(30) Foreign Application Priority Data

Feb. 21, 2000  (KR) ................................ 2000-8307

(51) Int. Cl.
*G02F 1/13* (2006.01)
*G02F 1/1343* (2006.01)
*G02F 1/136* (2006.01)

(52) U.S. Cl. ..................... 349/187; 349/144; 349/42; 349/43

(58) Field of Classification Search ............... 349/187, 349/144, 42, 43
See application file for complete search history.

(56) References Cited

U.S. PATENT DOCUMENTS

| | | | | |
|---|---|---|---|---|
| 5,453,659 A | * | 9/1995 | Wallace et al. | 313/495 |
| 5,476,320 A | * | 12/1995 | Taguchi et al. | 366/152.1 |
| 5,907,008 A | * | 5/1999 | Nakano et al. | 524/430 |
| 6,022,753 A | * | 2/2000 | Park et al. | 438/30 |
| 6,077,560 A | * | 6/2000 | Moshrefzadeh et al. | 427/108 |
| 6,077,643 A | * | 6/2000 | Kumar et al. | 430/270.1 |
| 6,090,526 A | * | 7/2000 | Kumar | 430/285.1 |
| 6,107,641 A | * | 8/2000 | Mei et al. | 257/66 |
| 6,117,294 A | * | 9/2000 | Rasmussen | 204/485 |
| 6,159,654 A | * | 12/2000 | Machida et al. | 430/270.1 |
| 6,184,964 B1 | * | 2/2001 | Kameyama et al. | 349/147 |
| 6,187,519 B1 | * | 2/2001 | Sugawara | 430/399 |
| 6,201,343 B1 | * | 3/2001 | Spindt et al. | 313/310 |
| 6,280,911 B1 | * | 8/2001 | Trfonas, III | 430/326 |
| 6,300,035 B1 | * | 10/2001 | Thackeray et al. | 430/270.1 |
| 6,407,790 B1 | * | 6/2002 | Chen | 349/124 |
| 6,410,209 B1 | * | 6/2002 | Adams et al. | 430/311 |

* cited by examiner

*Primary Examiner*—Dung T. Nguyen
*Assistant Examiner*—Mike Qi
(74) *Attorney, Agent, or Firm*—McKenna Long & Aldridge LLP

(57) ABSTRACT

A method of fabricating a liquid crystal display using a negative photo-resist. A passivation layer covering a thin film transistor, a data line, and a gate line is formed on a transparent substrate. The passivation layer is patterned to define a contact hole that exposes a drain electrode. A transparent conductive film in electrical contact with the drain electrode via the contact hole is then formed on the passivation layer. A negative-type photoresist is coated on the transparent conductive film. The transparent conductive film is then exposed with an image of the desired pixel electrode. The negative-type photoresist is then developed to expose portions of the transparent conductive film over a data line, a gate line, and the area of the thin film transistor area. The exposed transparent conductive film is then etched.

10 Claims, 8 Drawing Sheets

METHOD OF FABRICATING LIQUID CRYSTAL DISPLAY

This application claims the benefit of Korean Patent Application No. 2000-08307, filed on Feb. 21, 2000, which is hereby incorporated by reference for all purposes as if fully set forth herein.

BACKGROUND OF THE INVENTION

1. Field of the Invention

The present invention relates to a liquid crystal display, and more particularly, to a method of fabricating a liquid crystal display (LCD) for preventing an electrical short.

2. Discussion of the Related Art

Generally, a liquid crystal display (LCD) includes switching devices consisting of thin film transistors, each having a gate electrode, a gate insulating film, an active layer, an ohmic contact layer, and source and drain electrodes. Liquid crystal is injected between a lower plate provided with pixel electrodes and an upper plate provided with color filters.

In the LCD, N×M unit pixels (wherein N and M are integers), each of which includes a thin film transistor as a switching device and a pixel electrode that is coupled with the thin film transistor, are vertically and horizontally arranged in a matrix. The pixel electrodes are driven by the thin film transistors to control the liquid crystal's transmission or reflection of incident light.

FIGS. 1A to 1E shows a process of fabricating a conventional LCD.

Figure 1A:
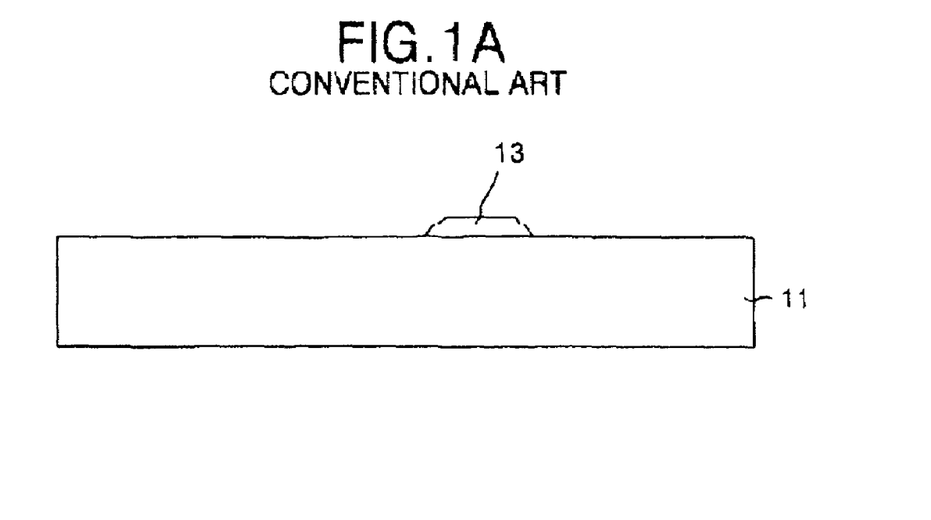
FIG. 1A to FIG. 1E are section views showing a conventional process of fabricating a liquid crystal display.

Referring to FIG. 1A, aluminum (Al) or copper (Cu) is deposited, beneficially by sputtering, on a transparent substrate 11 to form a metal thin film. The metal thin film is then patterned to remain only at a desired portion of the transparent substrate 11 by photolithography, beneficially using a wet method, to form a gate electrode 13 that is electrically connected to a gate line (not shown).

Figure 1B:
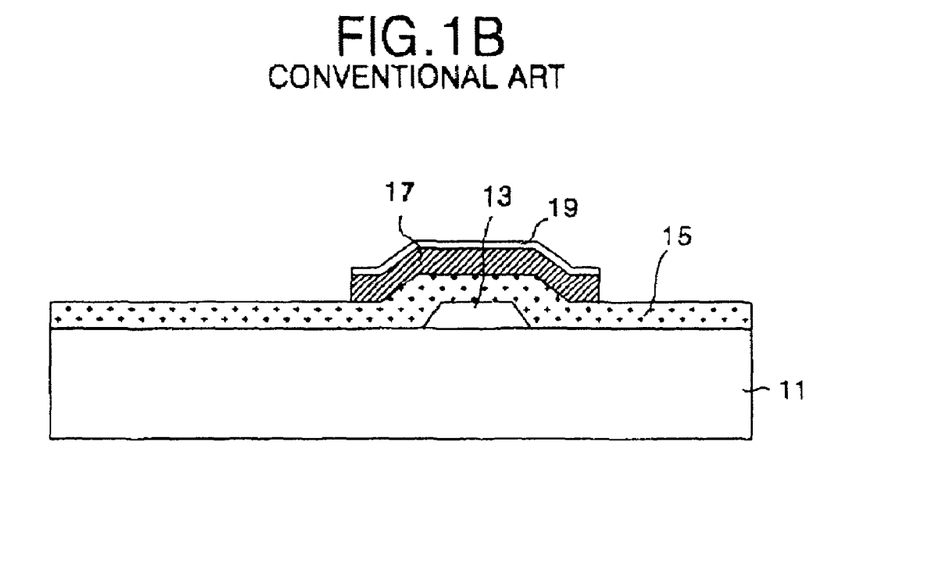

Referring to FIG. 1B, a gate insulating film 15, an active layer 17 and an ohmic contact layer 19 are sequentially formed on the transparent substrate 11 by chemical vapor deposition (CVD) so as to cover the gate electrode 13. The gate insulating film 15 is formed by depositing an insulation material, such as silicon oxide or silicon nitride. The active layer 17 is formed from a deposition of an undoped amorphous silicon or an undoped polycrystalline silicon. The ohmic contact layer 19 is formed from an amorphous silicon, or from a polycrystalline silicon, that is doped with an n-type or p-type impurity at a high concentration.

Desired portions of the ohmic contact layer 19 and the active layer 17 are patterned by photolithography using anisotropic etching so as to expose the gate insulating film 15. At this time, the active layer 17 and the ohmic contact layer 19 remain adjacent the gate electrode 13.

Figure 1C:
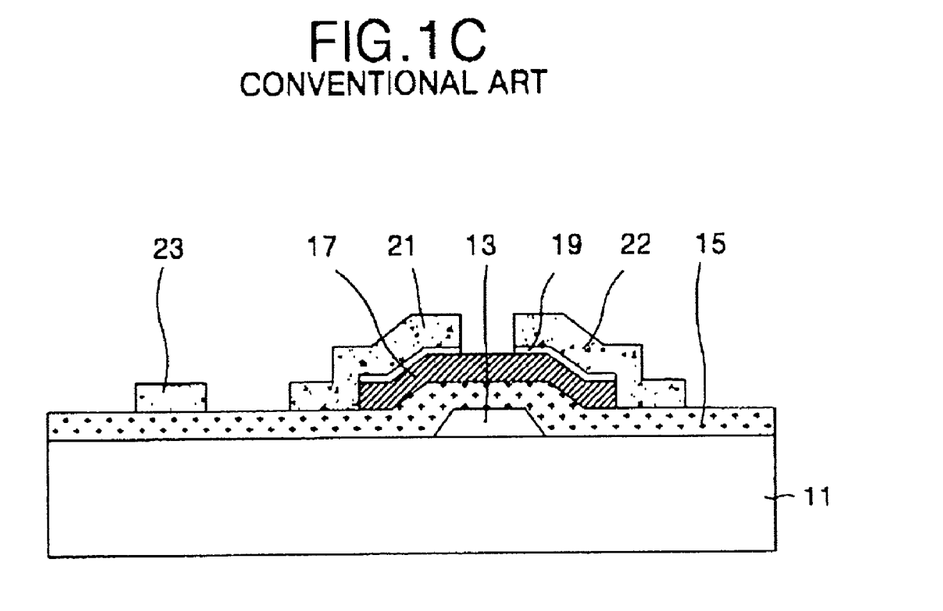

Referring to FIG. 1C, a metal, such as molybdenum (Mo), chrome (Cr), titanium (Ti) or tantalum (Ta), or a molybdenum alloy such as MoW, MoTa or MoNb, is deposited, beneficially by CVD or sputtering, on the gate insulating film 15 and over the ohmic contact layer 19. The deposited metal forms an ohmic contact with the ohmic contact layer 19. Then, the deposited metal is patterned by photolithography to expose the gate insulating film 15, thereby forming source and drain electrodes 21 and 22. At this time, a data line 23 that electrically connects to the source electrode 21 is formed perpendicularly to the gate line (not shown), thus defining a pixel area (not shown). When the source and drain electrodes 21 and 22 are formed, the ohmic contact layer 19 between the source and drain electrodes 21 and 22 is also patterned so as to expose the active layer 17. The active layer between the source and drain electrodes 21 and 22 forms a channel.

Figure 1D:
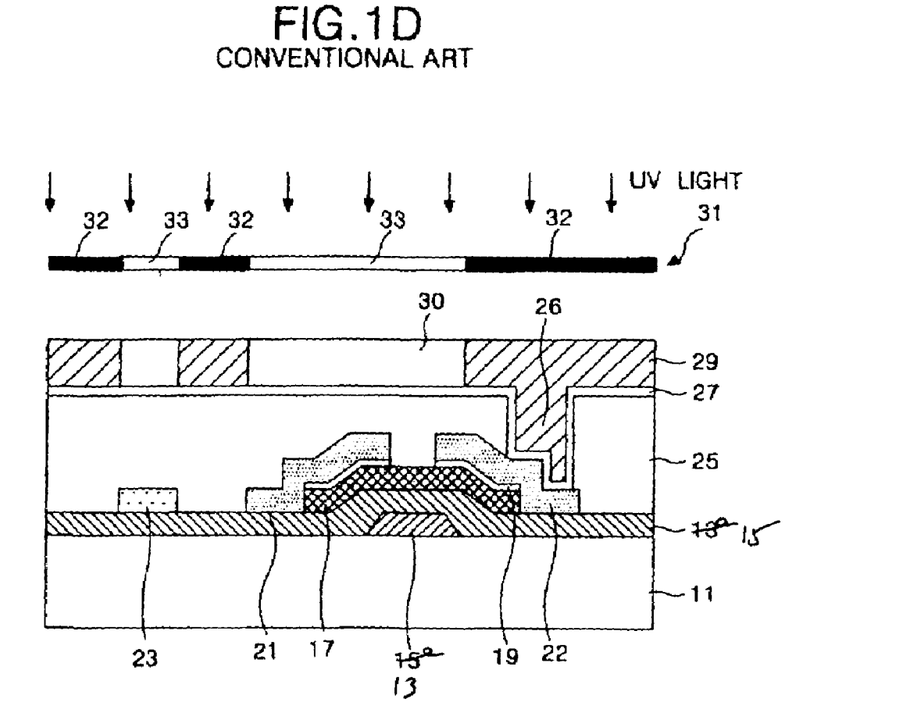

Referring to FIG. 1D, a passivation layer 25 that covers the above-mentioned structure is then formed over the transparent substrate 11. The passivation layer 25 is made from an inorganic insulating material, such as silicon nitride or silicon oxide, or from an organic insulation material having a small dielectric constant, such as acrylic organic compound, BCB (β-stagged-divinyl-siloxane benzocyclobutane) or PFCB (perfluorocyclobutane).

Then, the passivation layer 25 is patterned to define a contact hole 26 that exposes the drain electrode 22. A transparent conductive material, such as indium tin oxide (ITO), tin oxide (TO) or indium zinc oxide (IZO), is then deposited on the passivation layer 25 in such a manner as to electrically contact the drain electrode 22 via the contact hole 26. The result is a transparent conductive film 27.

A positive-type photoresist 29 is then coated on the transparent conductive film 27. Ultraviolet rays are then selectively irradiated onto the photoresist 29 using an exposure mask 31 having a shielding part 32 and a transparent part 33. At this time, an exposed area 30 is defined in the photoresist 29. The exposed area forms a high polymer state via the light passing through the transparent part 33 of the exposure mask 31. The exposed area 30 is formed in correspondence with the data line 23, the gate line (not shown), and the thin film transistor.

Figure 1E:
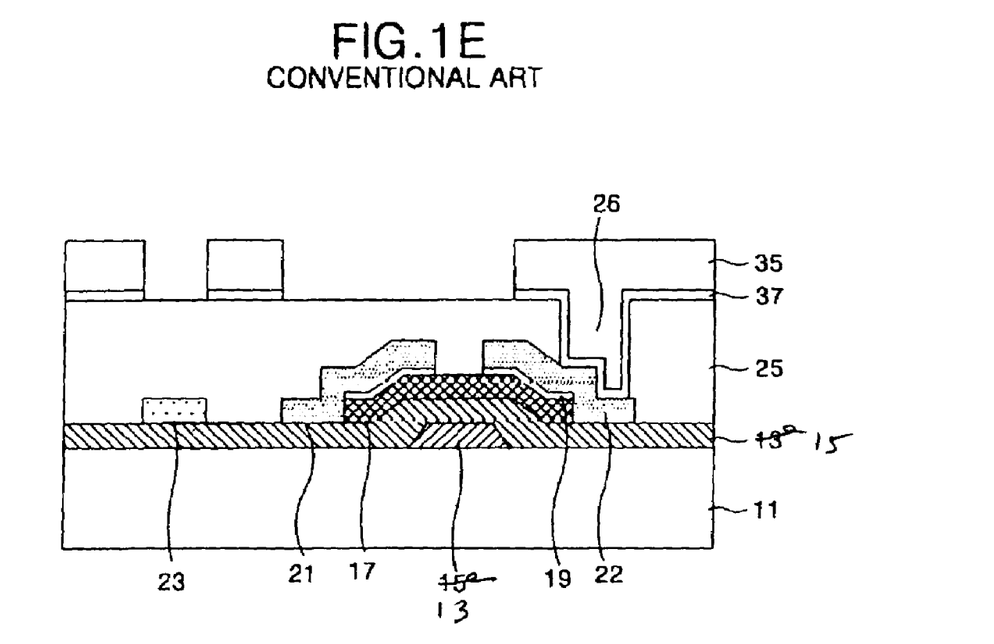

Referring to FIG. 1E, the photoresist 29 is developed with a developer, such as an aqueous alkali solution. After this, only the unexposed portion of the photoresist 29 remains, while the photoresist 29 in the exposed area 30 is removed to expose the transparent conductive film 27. The remaining photoresist 29 forms a photoresist pattern 35 that acts a mask during the patterning of the exposed portion of the transparent conductive film 27. Patterning is beneficially performed by photolithography using a mixture acid, such as HCl, $(COOH)_2$ or $HCl+HNO_3$, as an etchant liquid. The result is a pixel electrode 37. As shown, the pixel electrode 37 is in electrical contact with the drain area 22. Thereafter, the remaining photoresist pattern 35 is removed.

In the conventional LCD fabricating method described above, the pixel electrode is formed by coating a transparent conductive film with a positive-type photoresist. Next, a pattern for the pixel electrode is produced by exposing and developing the positive-type photoresist so as to expose a portion of the transparent conductive film. That pattern corresponds to a data line, to a gate line, and to a thin film transistor. Finally, the exposed portion of the transparent conductive film is wet etched. However, if a foreign substance is at a portion corresponding to the data line or to the gate line before the photo process, such as before or after the photoresist coating, sufficient light energy is not delivered to the exposed area. The result can be photoresist remaining on a portion of the pixel electrode that corresponds to the data line or to the gate line. Since any remaining photoresist protects the transparent conductive film from being etched, adjacent pixel electrodes can become electrically shorted.

SUMMARY OF THE INVENTION

Accordingly, the present invention is directed to a method of fabricating liquid crystal displays that substantially obviates one or more of the problems due to limitations and disadvantages of the related art.

An object of the present invention is to provide a method of fabricating a liquid crystal display that is capable of preventing electrical shorts between pixel electrodes.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of fabricating a liquid crystal display device having a thin film transistor is provided. The thin film transistor includes a gate electrode, a gate insulating film, an active layer, an ohmic contact layer, and source and drain electrodes on a transparent substrate. A gate line is connected to the gate electrode, and a data line is connected to the source electrode. The gate line and the data line are formed perpendicular to each other and define a pixel area. A passivation layer is formed over the thin film transistor and over the data electrode. Patterning the passivation layer defines a contact hole that exposes part of the drain electrode. A transparent conductive film in electrical contact with the drain electrode via the contact hole is then formed on the passivation layer. A negative-type photoresist is then coated on the transparent conductive film. That photoresist is then exposed in correspondence with a desired pixel area. The negative-type photoresist is then developed such that the unexposed area is removed, thereby forming a photoresist pattern. As the unexposed area corresponds to the data line, to the gate line, and to the thin film transistor, after development the transparent conductive film above the data line, the gate line, and the thin film transistor is exposed. The transparent conductive film is then etched using the photoresist pattern as a mask to form a pixel electrode that is in electrical contact with the drain electrode via the contact hole. The remaining photoresist pattern is then removed.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiment of the present invention, an example of which is illustrated in the accompanying drawings.

Figure 2A:
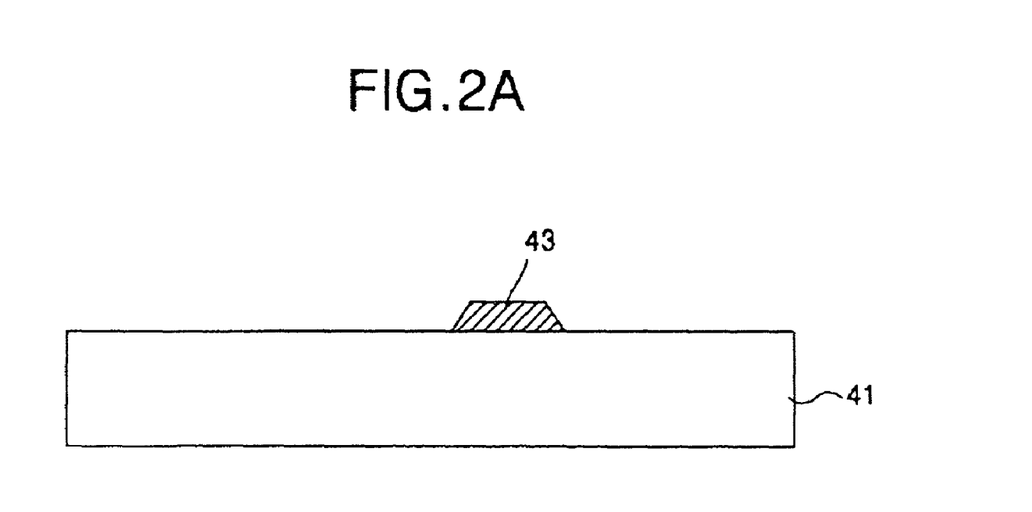
FIG. 2A to FIG. 2E are section views showing a process of fabricating a liquid crystal display according to an embodiment of the present invention.

Referring to FIG. 2A, aluminum (Al) or copper (Cu) is deposited on a transparent substrate 41, such as by sputtering technique or electroless plating, to form a metal thin film. A glass, a quartz, or a transparent plastic may be used for the transparent substrate 41. Then, the metal thin film is patterned to remain only at a desired portion of the transparent substrate 41 to form a gate electrode 43 that is electrically connected to a gate line (not shown). Patterning is beneficially performed by photolithography using a wet method.

Figure 2B:
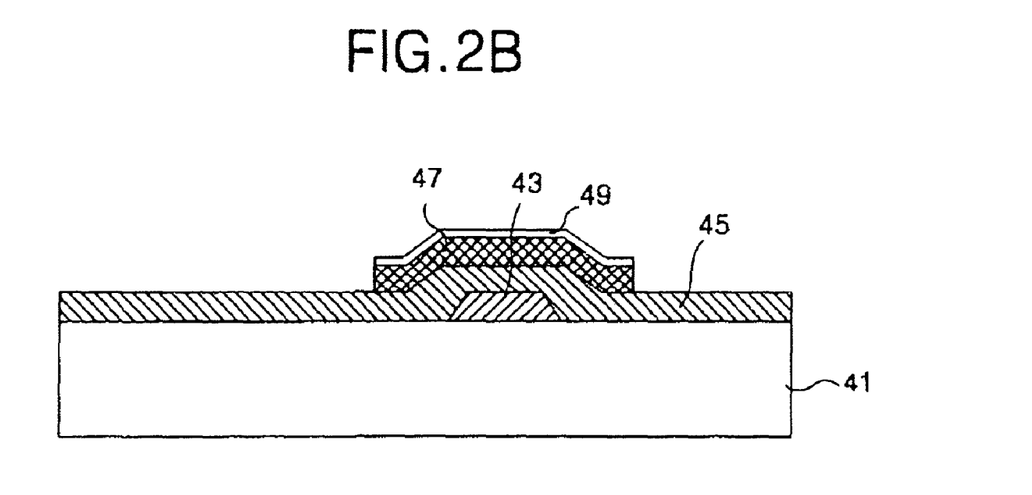

Referring to FIG. 2B, a gate insulating film 45, an active layer 47, and an ohmic contact layer 49 are sequentially formed on the transparent substrate 41, beneficially by chemical vapor deposition (CVD), so as to cover the gate electrode 43 and the gate line (which is not shown). The gate insulating film 45 is formed depositing an insulation material, such as silicon oxide or silicon nitride. The active layer 47 is formed from an undoped amorphous silicon or from an undoped polycrystalline silicon. The ohmic contact layer 49 is formed from amorphous silicon, or from polycrystalline silicon, that is doped with an n-type or p-type impurity at a high concentration.

A desired portion of the ohmic contact layer 49 and the active layer 47 is then patterned, beneficially by photolithography using anisotropic etching, in such a manner as to expose the gate insulating film 45. At this time, the active layer 47 and the ohmic contact layer 49 remain adjacent to the gate electrode 43.

Figure 2C:
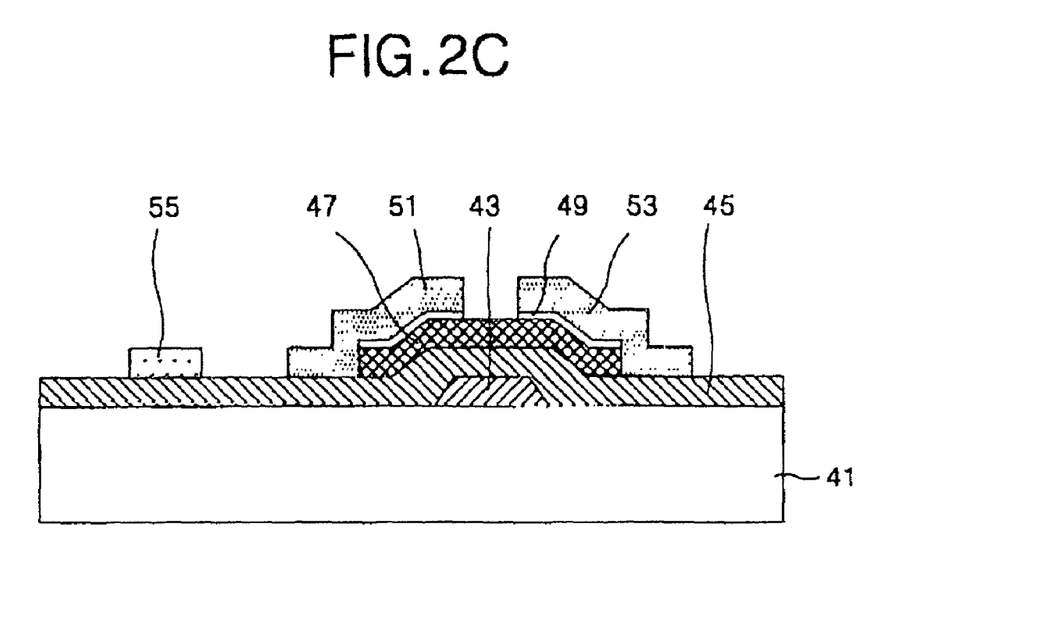

Referring to FIG. 2C, a metal such as molybdenum (Mo), chrome (Cr), titanium (Ti), or tantalum (Ta), or a molybdenum alloy such as MoW, MoTa or MoNb, is then deposited on the gate insulating film 45, beneficially by CVD or sputtering, so as to cover the ohmic contact layer 49. The deposited metal forms an ohmic contact with the ohmic contact layer 49. Then, the deposited metal is patterned by photolithography to expose the gate insulating film 45, thereby forming source and drain electrodes 51 and 53. At this time, a data line 55, which is electrically connected to the source electrode 51, is formed perpendicular to the gate line (not shown). The data line and gate line define a pixel area (also not shown).

When the source and drain electrodes 51 and 53 are formed, the ohmic contact layer 49 positioned above the gate electrode 43 and between the source and drain electrodes 51 and 53 is patterned to expose part of the active layer 47. The exposed part of the active layer 47 forms a channel.

Figure 2D:
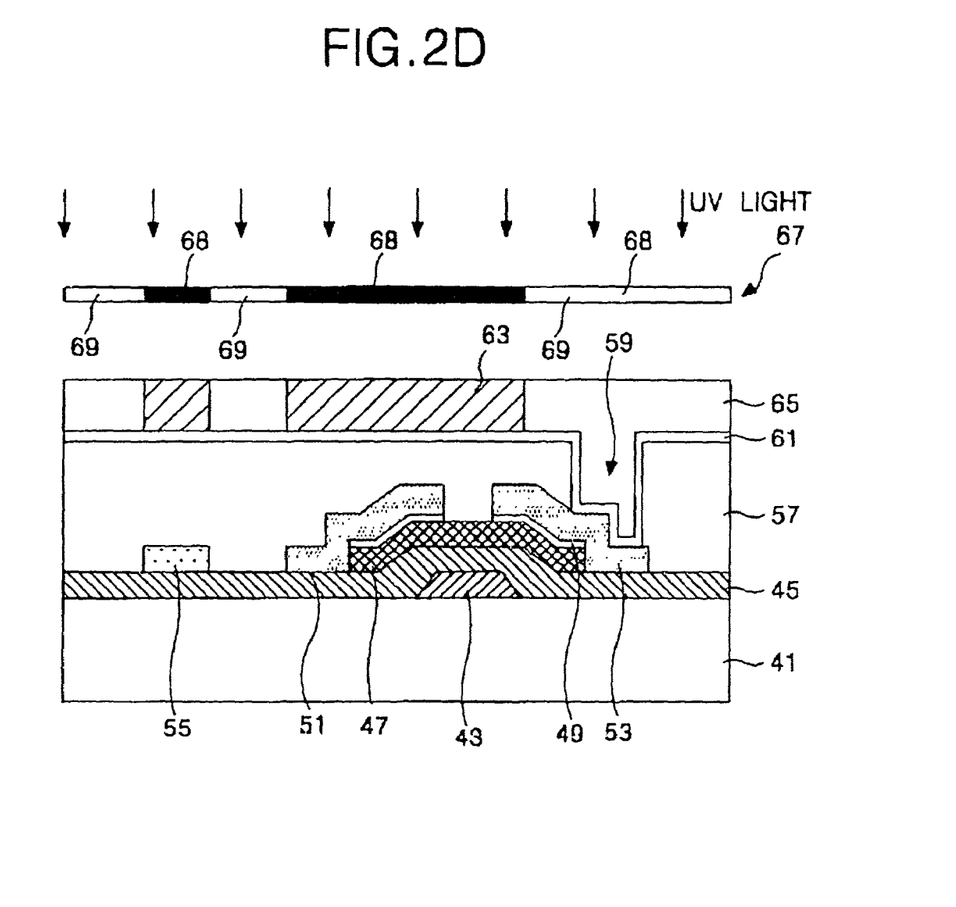

Referring to FIG. 2D, a passivation layer 57 that covers the above-mentioned structure is then formed on the transparent substrate 41. The passivation layer 57 is made from an inorganic insulating material, such as silicon nitride or silicon oxide, or from an organic insulation material having a small dielectric constant, such as acrylic organic compound, BCB (β-stagged-divinyl-siloxane benzocyclobutane) or PFCB (perfluorocyclobutane).

Then, the passivation layer 57 is patterned to define a contact hole 59 that exposes the drain electrode 53. A transparent conductive material, such as indium tin oxide (ITO), tin oxide (TO) or indium zinc oxide (IZO), is then deposited over the passivation layer 57 in such a manner as to electrically contact the drain electrode 53 via the contact hole 59. The deposited transparent conductive material forms a transparent conductive film 61.

A negative-type photoresist 63 is then coated over the transparent conductive film 61 at a thickness of about 1.0 to 2.0 μm. The negative-type photoresist is then soft-baked at a temperature of about 100° C. to 125° C.

An exposure mask 67 having a shielding part 68 and a transparent part 69 is then used to exposure the photoresist 63. Exposure of the photoresist 63 is performed using ultraviolet light that passes through the transparent part 69. The result is an exposed area 65 over the pixel area (not shown) that defines the desired pixel electrode. A post-exposure bake (PEB) is then performed.

During exposure, a photo acid is generated in the exposed portion of the photoresist 63 by the ultra-violet light energy. A bridge formation is made by the generated photo acid during PEB to make the exposed area 65 have a high polymer state. PEB is preferably performed between 110° C. and 150° C. More preferably, PEB is conducted between 125° C. to 145° C.

As previously mentioned, the negative photoresist is exposed in correspondence with a desired pixel electrode. The unexposed portion of the negative-type photoresist corresponds to the data line, to the gate line, and to the thin film transistor.

Figure 2E:
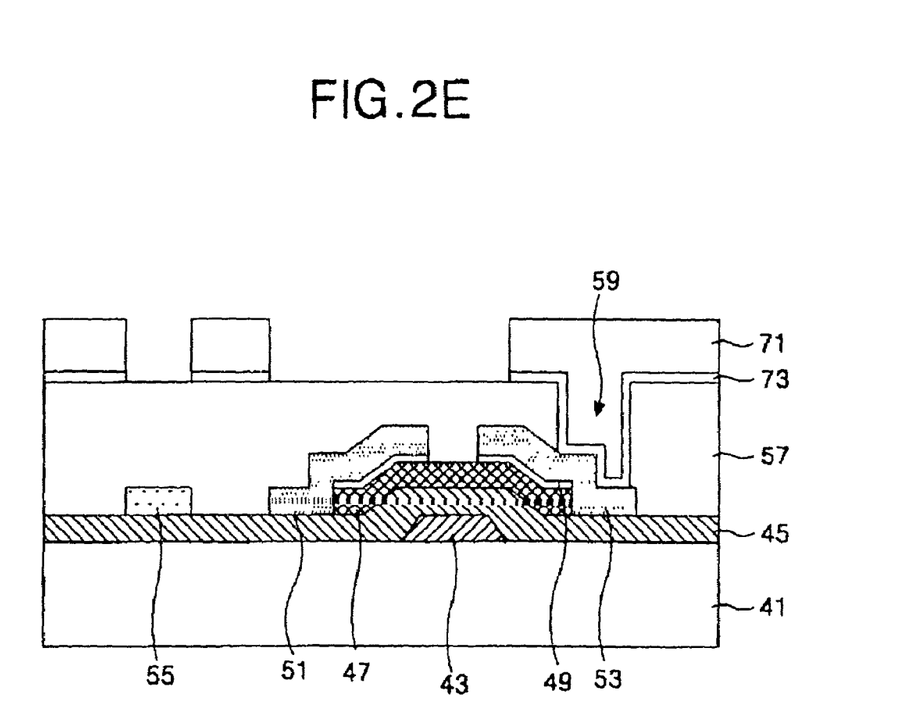

Referring to FIG. 2E, the photoresist 63 is then developed with an aqueous alkali developer, such as TMAH, for about 60 to 120 seconds. At this time, the portion of the photoresist 63 that was not UV-light exposed is removed, thus exposing part of the transparent conductive film 61. Thus after development, the transparent conductive film 61 above the data line, the gate line, and the thin film transistor is exposed. The exposed area 65, which has a high polymer state and thus is not removed, forms a photoresist pattern 71.

The photoresist pattern 71 is used as a mask during patterning of the exposed portion of the transparent conductive film 61. Patterning is beneficially performed by photolithography using a mixture acid, such as HCl, $(COOH)_2$ or $HCl+HNO_3$, as an etchant liquid. The result is a pixel electrode 73 that is in electrical contact with the drain area 53.

If a foreign substance was on a portion of the transparent conductive film 61 that corresponds to the data line 55, to the gate line (not shown), or to the thin film transistor area before photo-processing (either before or after photoresist coating), that foreign substance would not effect exposure. Because a negative photoresist was used, the portion with the foreign substance was not exposed. Accordingly, the foreign substance can be removed before, or during, patterning of the transparent conductive film 61. Thus, a foreign substance does not cause residual photoresist to exist between adjacent pixel electrodes 73, and thus adjacent pixel electrodes do not electrically short to each other.

Thereafter, the photoresist pattern 71 remaining on the pixel electrode 73 is removed.

As described above, according to the present invention, a negative-type photoresist is used. Exposure of the photoresist to define a desired pixel electrode, and subsequent removal of the unexposed portions of the photoresist, which correspond to a data line, to a gate line, and to a thin film transistor area, exposes corresponding portions of a material used to form the pixel electrode. Thus, foreign substances cannot cause residual photoresist in the corresponding portions of the pixel electrode material. Accordingly, residual photoresist caused by foreign substances will not cause electrical shorts between adjacent pixel electrodes.

It will be apparent to those skilled in the art that various modifications and variation can be made in the present invention without departing from the spirit or scope of the invention. Thus, it is intended that the present invention covers the modifications and variations of this invention provided they come within the scope of the appended claims and their equivalents.

What is claimed is:

1. A method of fabricating a liquid crystal display device having a thin film transistor with a gate electrode, a gate insulating film, an active layer, an ohmic contact layer, and source and drain electrodes on a transparent substrate, the liquid crystal display further includes a gate line connected to the gate electrode and a data line connected to the source electrode that define a pixel area, said method comprising the steps of:

forming a passivation layer covering the thin film transistor and the data line on the transparent substrate and patterning the passivation layer to define a contact hole for exposing the drain electrode;

forming a transparent conductive film being in contact with the drain electrode via the contact hole on the passivation layer;

coating a negative-type photoresist on the transparent conductive film and forming an exposed area defining a pixel area at the remaining portion thereof other than a portion corresponding to the data line, the gate line and the thin film transistor area;

developing the photoresist such that the unexposed area is removed, thereby forming a photoresist pattern;

patterning the transparent conductive film using the photoresist pattern as a mask to form a pixel electrode in contact with the drain electrode via the contact hole; and removing the photoresist pattern, wherein the photoresist is coated into a thickness of 1.0 to 2.0 µm and is soft-baked at a temperature of 100° C. to 125° C., wherein the exposed area is formed by exposing the photoresist to a light passing through a transparent part of an exposure mask having an exposure part and said transparent part and then post exposure baking the exposed photoresist, and wherein said post exposure baking is conducted at a temperature of 125° C. to 145° C.

2. The method according to claim 1, wherein said exposure part of the exposure mask corresponds to the pixel area, and a shielding part thereof corresponds to the data line, the gate line and the thin film transistor area.

3. A method of fabricating a liquid crystal display device, comprising:

forming a thin film transistor having a gate electrode, a source electrode, and a drain electrode on a transparent substrate;

forming both a gate line that is electrically connected to the gate electrode and a data line that is electrically connected to the source electrode;

forming a passivation layer over the thin film transistor, the gate line, and the data line;

forming a transparent conductive film over the passivation layer;

coating the transparent conductive film with a negative-type photoresist;

exposing the negative-type photoresist with an image of a pixel electrode, wherein the image of a pixel electrode does not fully extend across the data line and the gate line;

developing the negative-type photoresist such that the unexposed area of the negative-type photoresist is removed and a portion of the transparent conductive film is exposed; and patterning the transparent conductive film using the photoresist pattern to form a pixel electrode wherein the negative-type photoresist is coated with a thickness of 1.0 to 2.0 µm and soft-baked at a temperature between 100° C. to 125° C. before exposure, and wherein said post exposure baking is conducted at a temperature of 125° C. to 145° C.

4. The method of fabricating a liquid crystal display device according to claim 3, further including removing the photoresist pattern.

5. The method of fabricating a liquid crystal display device according to claim 3, wherein exposure is performed by passing light through an exposure mask having transparent part and an opaque part.

6. A method of fabricating a liquid crystal display device according to claim 5, wherein ultraviolet light passing is used for exposure.

7. A method of fabricating a liquid crystal display device according to claim 3, wherein patterning the transparent conductive film uses a wet etchant.

8. The method of fabricating a liquid crystal display device according to claim 3, wherein developing the negative-type photoresist uses an aqueous alkali solution.

9. The method of fabricating a liquid crystal display device according to claim 3, further including forming a contact hole through the passivation layer so as to expose the drain electrode.

10. A method of fabricating a liquid crystal display device according to claim 9, wherein the transparent conductive film contacts the drain electrode through the contact hole.

* * * * *